(12) United States Patent
Tsukao et al.

(10) Patent No.: US 10,632,912 B2
(45) Date of Patent: Apr. 28, 2020

(54) ALARM DEVICE

(71) Applicant: AISIN SEIKI KABUSHIKI KAISHA, Kariya-shi, Aichi-ken (JP)

(72) Inventors: Kosuke Tsukao, Toyota (JP); Hironobu Tsukazaki, Kariya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 16/375,183

(22) Filed: Apr. 4, 2019

(65) Prior Publication Data

US 2019/0308554 A1 Oct. 10, 2019

(30) Foreign Application Priority Data

Apr. 4, 2018 (JP) ................... 2018-072539

(51) Int. Cl.
*B60Q 9/00* (2006.01)
*G06K 9/00* (2006.01)
*G06F 3/01* (2006.01)

(52) U.S. Cl.
CPC .............. *B60Q 9/00* (2013.01); *G06F 3/013* (2013.01); *G06K 9/00597* (2013.01); *G06K 9/00845* (2013.01)

(58) Field of Classification Search
CPC ...... B60Q 9/00; G06F 3/013; G06K 9/00597; G06K 9/00845
See application file for complete search history.

(56) References Cited

U.S. PATENT DOCUMENTS

| 5,621,457 | A | * | 4/1997 | Ishiwaka | ............ | G01C 21/3641 |
| | | | | | | 348/78 |
| 2007/0089054 | A1 | * | 4/2007 | Morimoto | ................ | B60Q 9/00 |
| | | | | | | 715/700 |
| 2009/0273687 | A1 | * | 11/2009 | Tsukizawa | .............. | G06F 3/012 |
| | | | | | | 348/222.1 |
| 2015/0363657 | A1 | * | 12/2015 | Shigemura | ............... | A61B 5/18 |
| | | | | | | 382/104 |

FOREIGN PATENT DOCUMENTS

| JP | 09-238905 A | 9/1997 |
| JP | 2007-094618 A | 4/2007 |

* cited by examiner

*Primary Examiner* — Joseph H Feild
*Assistant Examiner* — Rufus C Point
(74) *Attorney, Agent, or Firm* — Sughrue Mion, PLLC

(57) ABSTRACT

An alarm device includes: a host vehicle information acquisition unit; a vehicle external information acquisition unit; a visual attention target calculation unit calculating a target to which attention of a driver is required based on host vehicle information and vehicle external information; a sight line information acquisition unit acquiring sight line information about the driver; an eyeball position information acquisition unit acquiring eyeball position information about the driver; a visual attention point calculation unit calculating a point to which the driver pays attention, based on the sight line information and the eyeball position information; a determination unit determining whether the driver pays attention to the target, based on the target and the point; and a notification unit notifying the driver of a determination result when determined that the driver does not pay attention to the target.

13 Claims, 3 Drawing Sheets

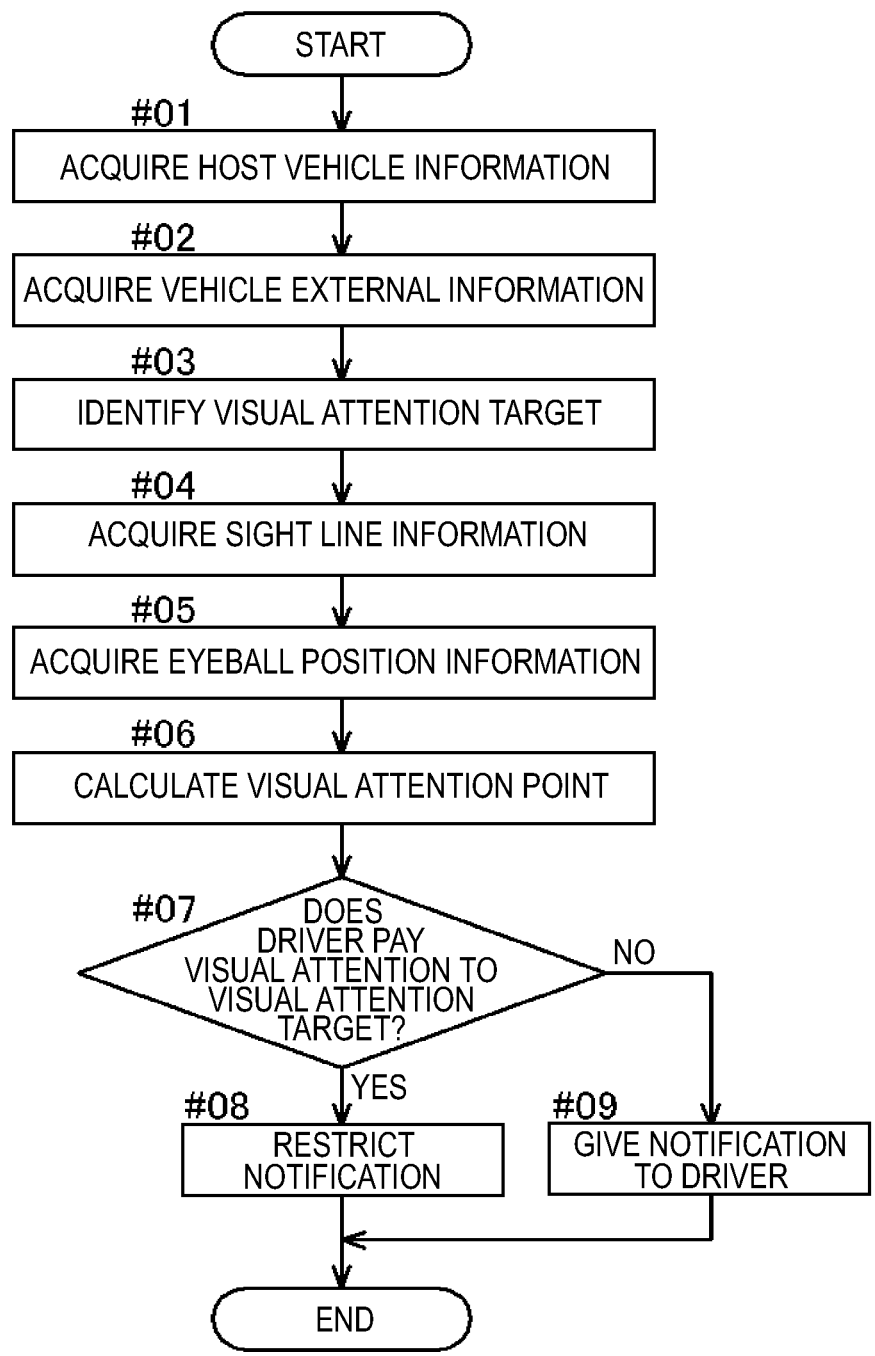

ALARM DEVICE

CROSS REFERENCE TO RELATED APPLICATIONS

This application is based on and claims priority under 35 U.S.C. § 119 to Japanese Patent Application 2018-072539, filed on Apr. 4, 2018, the entire contents of which are incorporated herein by reference.

TECHNICAL FIELD

This disclosure relates to an alarm device which issues an alarm in accordance with a visual attention status of a driver when the driver drives a vehicle.

BACKGROUND DISCUSSION

From a viewpoint of accident preventing or smooth traveling when a driver drives a vehicle, it is desirable that the driver sufficiently recognizes a status around the vehicle. Therefore, techniques for notifying the driver of the status in response to a sight line of the driver have been studied (for example, Reference 1 (JP 2007-94618A)).

A notification control device disclosed in Reference 1 includes identification means for identifying a confirmation required target which is a target requiring confirmation of a user, direction detection means for detecting a face of the user or a sight line orientation of the user, confirmation detection means for detecting whether or not the user confirms the confirmation required target, based on the detected face or the detected the sight line orientation; and notification control means for controlling notification to the user so as to notify the user of a status where the user needs to confirm the confirmation required target, in a case where it is not detected that the user confirms the confirmation required target, and so as to restrict the notification of the status where the user needs to confirm the confirmation required target, in a case where it is detected that the user confirms the confirmation required target.

According to the technique disclosed in Reference 1, the orientation of the face or the sight line orientation of the user (driver) is detected using an image captured by a monocular one-dimensional camera such as a CCD camera. Therefore, for example, if a teacher image is input for each individual person and there is no adjustment for each individual person, a visual attention point including three-dimensional information cannot be calculated, and detection accuracy becomes poor. Therefore, it is not possible to properly notify the driver of a detection result in response to a visual attention status of the driver.

Thus, a need exists for an alarm device which is not susceptible to the drawback mentioned above.

SUMMARY

A feature of an alarm device according to an aspect of this disclosure resides in that the alarm device includes a host vehicle information acquisition unit that acquires host vehicle information indicating a state of a host vehicle, a vehicle external information acquisition unit that acquires vehicle external information indicating a vehicle external status of the host vehicle, a visual attention target calculation unit that calculates a visual attention required target to which visual attention of a driver of the host vehicle is required, based on the host vehicle information and the vehicle external information, a sight line information acquisition unit that acquires sight line information indicating a sight line direction of the driver, an eyeball position information acquisition unit that acquires eyeball position information indicating an eyeball position of the driver on a three-dimensional coordinate, a visual attention point calculation unit that calculates a visual attention point to which the driver pays visual attention, based on the sight line information and the eyeball position information, a determination unit that determines whether or not the driver pays visual attention to the visual attention required target, based on the visual attention required target and the visual attention point, and a notification unit that notifies the driver of a determination result in a case where it is determined that the driver does not pay visual attention to the visual attention required target.

BRIEF DESCRIPTION OF THE DRAWINGS

The foregoing and additional features and characteristics of this disclosure will become more apparent from the following detailed description considered with the reference to the accompanying drawings, wherein:

FIG. 3 is a flowchart illustrating a process of the alarm device.

DETAILED DESCRIPTION

An alarm device according to an embodiment disclosed here is configured to be able to properly notify a driver of a detection result in response to a visual attention status of the driver. Hereinafter, an alarm device 1 according to the present embodiment will be described.

1. Configuration of Alarm Device

Figure 1:
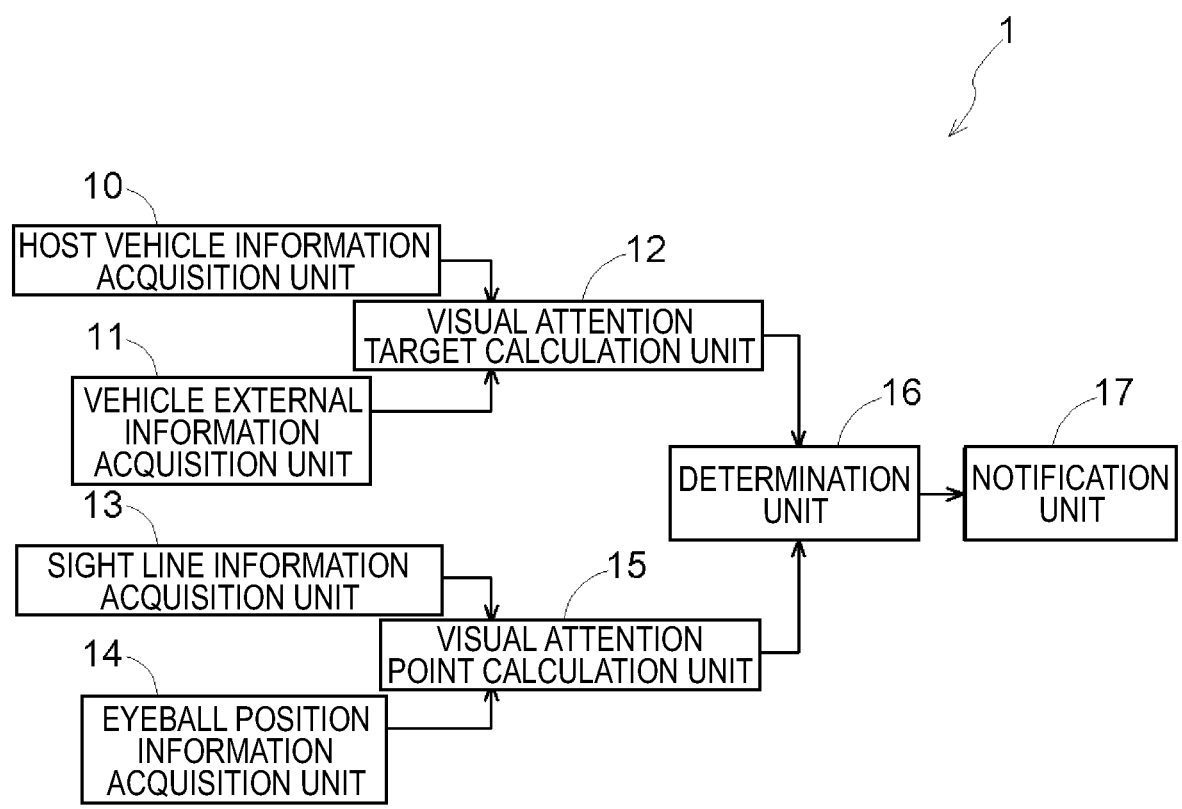
FIG. 1 is a block diagram illustrating a configuration of an alarm device.

FIG. 1 is a block diagram schematically illustrating a configuration of the alarm device 1. As illustrated in FIG. 1, the alarm device 1 includes respective functional units such as a host vehicle information acquisition unit 10, a vehicle external information acquisition unit 11, a visual attention target calculation unit 12, a sight line information acquisition unit 13, an eyeball position information acquisition unit 14, a visual attention point calculation unit 15, a determination unit 16, and a notification unit 17. In order to perform a process relating to notification to the driver, the respective functional units are constructed so that a CPU employs hardware, software, or both of these as a core member.

The host vehicle information acquisition unit 10 acquires host vehicle information indicating a state of a host vehicle. The host vehicle information indicates a state of a vehicle while the vehicle travels. Specifically, the host vehicle information includes traveling direction information indicating a traveling direction (moving direction) of the vehicle, position information indicating a position of the vehicle, brake information indicating an operation state of a brake of the vehicle, and shift information indicating a position of a shift lever of the vehicle.

The traveling direction information or the position information can be acquired based on a received signal by receiving a global positioning system (GPS) signal or global navigation satellite system (GNSS) signal. The brake information can be acquired based on a detection result of a brake sensor included in the vehicle. The shift information can be acquired based on a detection result of a shift sensor included in the vehicle.

The host vehicle information acquisition unit 10 acquires the traveling direction information, the position information, the brake information, and the shift information. Each information is transmitted to the visual attention target calculation unit 12 (to be described later) as the host vehicle information.

The vehicle external information acquisition unit 11 acquires vehicle external information indicating a vehicle external status of a host vehicle. For example, the vehicle external status of the host vehicle is map information indicating a map of surroundings including a place where the vehicle travels, object information indicating whether an object exists around the vehicle, and traffic volume information indicating a traffic volume while the vehicle travels. The map information can be acquired based on a map used in a car navigation system included in the vehicle. The object information can be acquired based on a detection result of a surroundings monitoring sensor included in the vehicle. The traffic volume information can be acquired based on vehicle information and communication system (VICS) (registered trademark) information used for a car navigation system included in the vehicle.

The vehicle external information acquisition unit 11 acquires the map information, the object information, and the traffic volume information. Each information is transmitted to the visual attention target calculation unit 12 (to be described later) as vehicle external information.

The visual attention target calculation unit 12 calculates a visual attention required target to which visual attention of a driver of the host vehicle is required, based on the host vehicle information and the vehicle external information. The host vehicle information is transmitted from the host vehicle information acquisition unit 10. The vehicle external information is transmitted from the vehicle external information acquisition unit 11. The visual attention required target to which visual attention of the driver of the host vehicle is required is an object to be confirmed while the driver drives the vehicle, out of objects existing around the vehicle. Specifically, the visual attention required target includes a traffic signal, a road sign, and a person, a bicycle, or other vehicles passing around the host vehicle.

For example, in a case where it is presumed that the host smoothly travels on a road, based on the map information and the VICS information, the visual attention target calculation unit 12 calculates the traffic signal or the road sign as the visual attention required target. In addition, in a case where the vehicle is stopped due to a red light signal, the traffic signal or a preceding vehicle of the host vehicle is calculated as the visual attention required target. In addition, in a case where the host vehicle starts to travel when the red light is changed to a green light, the person, the bicycle, or other vehicles passing around the host vehicle are calculated as the visual attention required target. As a matter of course, the visual attention required target is an example, and various targets are assumed depending on a traveling a status of the host vehicle.

Information indicating the visual attention required target calculated by the visual attention target calculation unit 12 includes information indicating a position of the target, and is transmitted to the determination unit 16 (to be described later).

The sight line information acquisition unit 13 acquires sight line information indicating a sight line direction of the driver. A sight line of the driver is a sight line of the driver of the host vehicle. Therefore, the sight line direction of the driver is a sight line orientation of the driver of the host vehicle. It is preferable that the sight line direction of the driver is detected by using a captured image through known image recognition processing in which the captured image including a face of the driver is acquired, for example, by a camera disposed inside the host vehicle. As a matter of course, a configuration can be adopted so as to detect the sight line direction of the driver by using other methods. The information indicating the sight line direction of the driver is handled as the sight line information by the alarm device 1, and is transmitted to the visual attention point calculation unit 15 (to be described later).

The eyeball position information acquisition unit 14 acquires eyeball position information indicating an eyeball position on a three-dimensional coordinate of the driver. The driver means the driver of the host vehicle. The eyeball position on the three-dimensional coordinate is not the eyeball position in an X-Y coordinate system, but the eyeball position in an X-Y-Z coordinate system. Therefore, in a case where the face of the driver is focused, not only a lateral direction and a longitudinal direction of the face but also a position in a depth direction are taken into consideration. For example, the eyeball position on the three-dimensional coordinate can be acquired based on a detection result of a distance image sensor by disposing the distance image sensor inside the host vehicle. As a matter of course, the eyeball position can be acquired using a stereo camera. The information indicating the eyeball position on the three-dimensional coordinate of the driver is handled as the eyeball position information by the alarm device 1, and is transmitted to the visual attention point calculation unit 15 (to be described later).

Based on the sight line information and the eyeball position information, the visual attention point calculation unit 15 calculates a visual attention point to which the driver pays visual attention. The sight line information is transmitted from the sight line information acquisition unit 13. The eyeball position information is transmitted from the eyeball position information acquisition unit 14. The visual attention point to which the driver pays visual attention means a point to which the driver of the host vehicle actually pays visual attention.

Based on the sight line direction indicated by the sight line information and the eyeball position on the three-dimensional coordinate, the visual attention point calculation unit 15 calculates the point which is located in the sight line direction of the driver and to which the driver actually pays visual attention on the three-dimensional coordinate. The visual attention point calculated by the visual attention point calculation unit 15 is transmitted to the determination unit 16 (to be described later) as information indicating the visual attention point.

According to the present embodiment, as described above, as the visual attention required target to which visual attention of the driver of the host vehicle is required, the visual attention target calculation unit 12 calculates a confirmation required target while the driver drives the host vehicle, out of objects existing around the host vehicle. The visual attention point calculation unit 15 is configured to calculate the visual attention point outside the host vehicle.

The determination unit 16 determines whether or not the driver pays visual attention to the visual attention required target, based on the visual attention required target and the visual attention point. The visual attention required target is calculated by the visual attention target calculation unit 12, and is transmitted from the visual attention target calculation unit 12 as information indicating the visual attention required target. The visual attention point is calculated by the visual attention point calculation unit 15, and is transmitted from the visual attention point calculation unit 15 as information indicating the visual attention point. The determination unit 16 determines whether or not the driver pays visual attention to the visual attention required target, based on whether or not the visual attention required target to which visual attention of the driver is required is the visual attention point.

Figure 2:
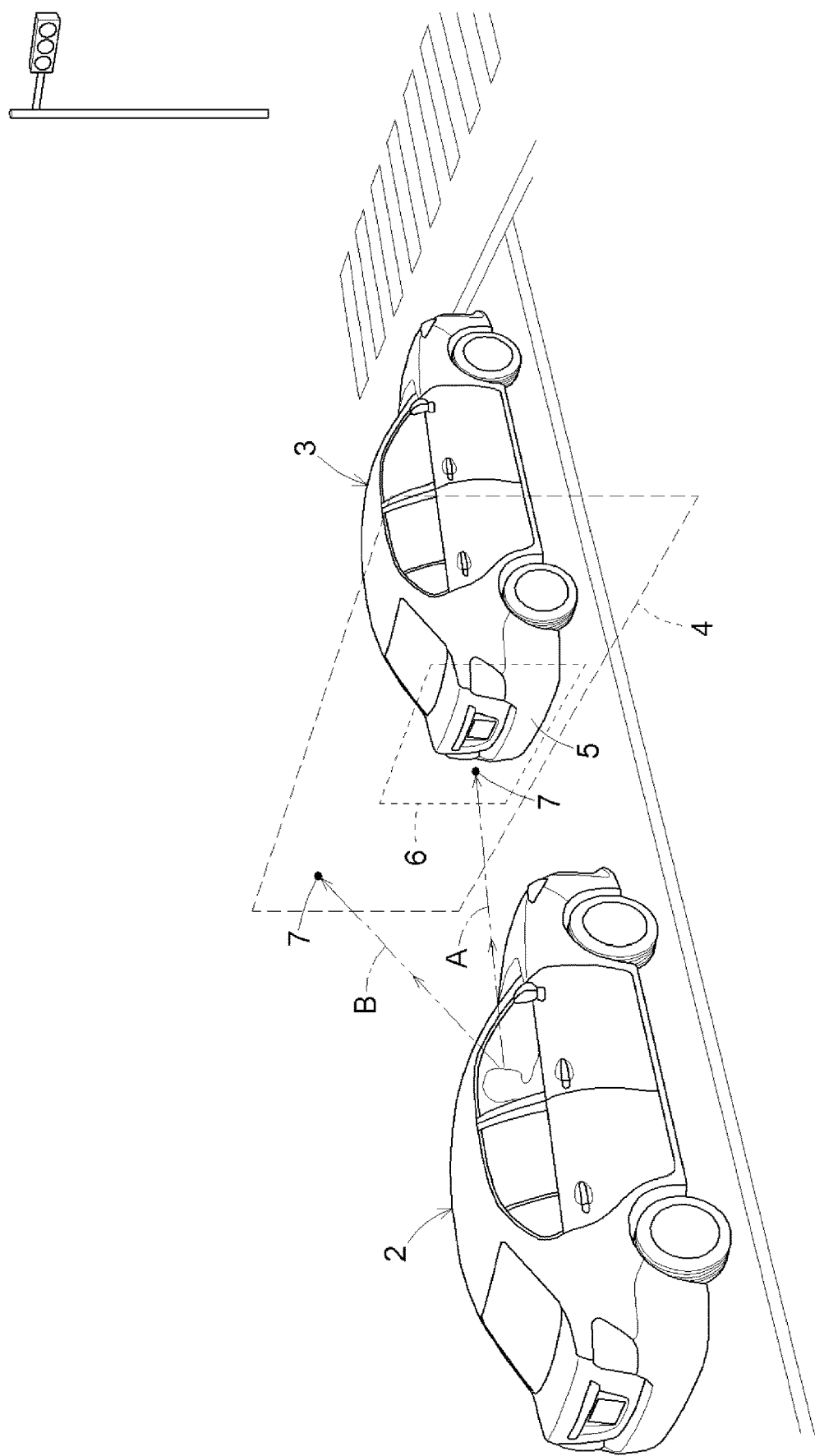
FIG. 2 illustrates a visual attention region.

The determination unit 16 may set a visual attention region on a virtual plane including the visual attention required target outside the host vehicle. In a case where the visual attention point is included in the visual attention region, it may be determined that the driver pays visual attention to the visual attention required target. For example, as illustrated in FIG. 2, a case may be considered where the host vehicle stops at the red light and the other vehicle stops in front of the host vehicle. In order to facilitate understanding, a reference numeral 2 will be given to the host vehicle, and a reference numeral 3 will be given to the other vehicle. In this case, the visual attention required target outside the host vehicle corresponds to the other vehicle 3. The determination unit 16 first sets a virtual plane 4 including the object (other vehicle 3). At this time, the determination unit 16 sets the virtual plane 4 so as to be equally distant from the eyeball position of the driver of the host vehicle with reference to a rear end part 5 of the other vehicle 3. Next, the determination unit 16 sets a visual attention region 6 including the rear end part 5 (for example, a bumper) of the other vehicle 3 in the virtual plane 4. In a case where the visual attention point (in FIG. 2, illustrated using a reference numeral 7) of the driver is included in the visual attention region 6 as illustrated by a sight line direction A, the determination unit 16 determines that the driver pays visual attention to the other vehicle 3 which requires the visual attention of the driver. On the other hand, in a case where the visual attention point 7 of the driver is not included in the visual attention region 6 as illustrated by a sight line direction B, the determination unit 16 determines that the driver does not pay visual attention to the other vehicle 3 which requires the visual attention of the driver.

A case where the visual attention required target is the other vehicle 3 is merely an example. Even if the visual attention required target is the traffic signal or a pedestrian, the traffic signal or the pedestrian can be determined in the same way. A determination result of the determination unit 16 is transmitted to the notification unit 17 (to be described later).

Referring back to FIG. 1, the notification unit 17 notifies the driver of the determination result, in a case where it is determined that the driver does not pay visual attention to the visual attention required target. The determination result is transmitted from the determination unit 16 to the notification unit 17. In a case where the determination result indicates that the driver does not pay visual attention to the visual attention required target, the notification unit 17 notifies the driver of the determination result. For example, the notification may be a notification clearly indicating that the driver does not pay visual attention to the visual attention required target, or may be a notification prompting the driver to pay visual attention to the visual attention required target. In this case, a configuration can be adopted so that the driver is notified of the determination result as well as information indicating what the visual attention required target is. In addition, the notification unit 17 may be configured to notify the driver of an alarm at an early stage, or may be configured to change a notification method. In a case where the determination result transmitted from the determination unit 16 indicates that the driver pays visual attention to the visual attention required target, the notification unit 17 may not notify the driver of the determination result. Alternatively, in a case where the driver is notified of the determination result after a predetermined time, the notification may be restricted.

2. Process of Alarm Device

Next, a process of the alarm device 1 will be described with reference to a flowchart in FIG. 3. First, the host vehicle information acquisition unit 10 acquires the host vehicle information (Step #01). In addition, the vehicle external information acquisition unit 11 acquires the vehicle external information (Step #02). The visual attention target calculation unit 12 calculates the visual attention required target (visual attention target), based on the host vehicle information and the vehicle external information (Step #03).

On the other hand, the sight line information acquisition unit 13 acquires the sight line information (Step #04). In addition, the eyeball position information acquisition unit 14 acquires the eyeball position information (Step #05). The visual attention point calculation unit 15 calculates the visual attention point, based on the sight line information and the eyeball position information (Step #06).

Out of the process in Step #01 to Step #03 and the process in Step #04 to Step #06, the process in Step #04 to Step #06 may be performed earlier than the process in Step #01 to Step #03. The process in Step #01 to Step #03 and the process in Step #04 to Step #06 may be performed in parallel with each other.

The determination unit 16 determines whether or not the driver pays visual attention to the visual attention target, based on the visual attention target and the visual attention point. In a case where the determination unit 16 determines that the driver pays visual attention to the visual attention target (Step #07: Yes), the notification unit 17 restricts the notification (Step #08). On the other hand, in a case where the determination unit 16 determines that the driver does not pay visual attention to the visual attention target (Step #07: No), the notification unit 17 gives the notification to the driver (Step #09). After Step #08 and Step #09, a series of processes is completed. The alarm device 1 performs the process in accordance with this flow.

3. Usage Mode of Alarm Device

Next, a usage mode of the alarm device 1 will be described. The following usage mode is merely an example, and the usage mode of the alarm device 1 is not limited to the following example.

3-1. Usage Mode Relating to Visual Attention to Blind Spot of Vehicle

The vehicle has a region (blind spot) which the driver is less likely to visually recognize. The alarm device 1 can be used for determining whether or not the driver pays visual attention to the blind spot and notifying the driver of the blind spot in accordance with a determination result. Here, a case where the host vehicle enters by turning right to a parking area or a narrow alley will be described as an example.

In this case, the host vehicle information acquisition unit 10 acquires steering angle information indicating a steering angle of the host vehicle and vehicle speed information indicating a vehicle speed of the host vehicle. In addition, a captured image is acquired by the vehicle external information acquisition unit 11 to image a blind spot region of the host vehicle. The captured image may be a corner view image including only the blind spot region, or may be an around view image including the blind spot region and surroundings thereof. In addition, the vehicle external information acquisition unit 11 acquires object information indicating whether or not an object exists around the host vehicle. The object information includes information indicating a position of the object. The visual attention target calculation unit 12 calculates the blind spot region, that is, a region forward and leftward of the vehicle, as a visual attention object (visual attention target).

The sight line information acquisition unit 13 acquires the sight line information relating to the driver, and the eyeball position information acquisition unit 14 acquires the eyeball position information relating to the driver. The visual attention point calculation unit 15 calculates the visual attention point of the driver, based on the sight line information and the eyeball position information.

The determination unit 16 determines whether or not the visual attention point of the driver is the region forward and leftward of the vehicle. In a case where the determination result of the determination unit 16 indicates that the visual attention point of the driver is the region forward and leftward of the vehicle, the notification unit 17 displays the captured image acquired by the vehicle external information acquisition unit 11 which images the blind spot region of the host vehicle, within a visual field of the driver and at a position which does not obstruct a sight line to the object indicated by the object information.

In this way, the alarm device 1 can be used for a system for allowing the driver to visually recognize a certain object without looking away from the blind spot region, in a status where there is a possibility that a forward corner portion of the vehicle may come into contact the certain object. In this usage mode, when the vehicle turns at a low speed, the alarm device 1 can detect the sight line of the driver which is oriented to a front side opposite to a turning direction of the vehicle bends, and can display an image obtained by imaging the blind spot region.

3-2. Usage Mode Relating to Visual Attention When Vehicle Starts

When the vehicle starts to move forward in a state where the vehicle is stopped, the driver has to pay attention to a forward side. In addition, when the vehicle is stopped, the driver may unintentionally weakly step on a brake pedal, and the vehicle may start, in some cases. The alarm device 1 can be used in order to determine whether or not the driver pays visual attention to the forward side when the vehicle starts, and in order to give the notification to the driver in accordance with the determination result.

In this case, the host vehicle information acquisition unit 10 acquires the vehicle speed information indicating the vehicle speed of the host vehicle. In addition, the vehicle external information acquisition unit 11 acquires the captured image obtained by imaging a forward status of the host vehicle. Based on the vehicle speed information, the visual attention target calculation unit 12 calculates the forward status of the vehicle as a visual attention object (visual attention target), if the visual attention target calculation unit 12 identifies that the vehicle is stopped.

The sight line information acquisition unit 13 acquires the sight line information relating to the driver, and the eyeball position information acquisition unit 14 acquires the eyeball position information relating to the driver. The visual attention point calculation unit 15 calculates the visual attention point of the driver, based on the sight line information and the eyeball position information.

The determination unit 16 determines whether or not the visual attention point of the driver is located forward of the host vehicle. The notification unit 17 issues an alarm (for example, emits an alarm sound) if the vehicle starts to move forward in a case where the determination result of the determination unit 16 indicates that the visual attention point of the driver is not located forward of the host vehicle. Instead of the alarm, or in conjunction with the warning, the alarm device 1 can control the brake so that the driver of the host vehicle stops moving forward.

In this way, the alarm device 1 can be used for a system which issues the alarm or controls the brake when the driver starts to drive the host vehicle in a state where the driver does not watch forward (including unintended traveling).

3-3. Usage Mode Relating to Guiding Sight Line to Object

Inattentive driving of the driver is very dangerous while the host vehicle travels. The alarm device 1 can be used in order to call the driver's attention to the inattentive driving.

In this case, the host vehicle information acquisition unit 10 acquires the steering angle information indicating the steering angle of the host vehicle and the vehicle speed information indicating the vehicle speed of the host vehicle. In addition, the vehicle external information acquisition unit 11 acquires the object information indicating whether or not the object exists around the host vehicle. The object information includes information indicating a position of the object. The visual attention target calculation unit 12 calculates the object indicated by the object information, as the visual attention target.

The sight line information acquisition unit 13 acquires the sight line information relating to the driver, and the eyeball position information acquisition unit 14 acquires the eyeball position information relating to the driver. The visual attention point calculation unit 15 calculates the visual attention point of the driver, based on the sight line information and the eyeball position information.

The determination unit 16 determines whether or not the visual attention point of the driver is the object located forward of the host vehicle. In a case where the determination result of the determination unit 16 indicates that the visual attention point of the driver is not the object located forward of the host vehicle, the notification unit 17 notifies the driver of a guidance that a sight line direction of the driver needs to be changed from a current direction to a direction of the object located forward of the host vehicle. For example, as the notification, the notification can be given to the driver by displaying an arrow so as to guide the sight line, or can be given to the driver by using voice. It is preferable to display the arrow on a front windshield, a side windshield, a monitor, a head-up display, or a meter display.

In this way, the alarm device 1 can be used for a system for guiding the sight line direction of the driver to a direction where the object exists, if the alarm device 1 detects the object (such as the other vehicle and the person) which is an obstacle in the traveling direction of the host vehicle during the inattentive driving of the driver.

3-4. Usage Mode Relating to Device Operation Using Sight Line of Driver

While the vehicle travels, it is dangerous for the driver to operate the device by taking the driver's hand off a steering wheel. The alarm device 1 can be used for a system which enables the driver to operate the device without taking the driver's hand off the steering wheel.

In this case, it is assumed that a device which is operated by using the voice and whose operation using the voice can be performed by the sight line of the driver is installed inside the host vehicle. Therefore, in this usage mode, the visual attention target corresponds to the device installed inside the host vehicle.

The sight line information acquisition unit 13 acquires the sight line information relating to the driver, and the eyeball position information acquisition unit 14 acquires the eyeball position information relating to the driver. The visual attention point calculation unit 15 calculates the visual attention point of the driver, based on the sight line information and the eyeball position information.

The determination unit 16 determines whether or not the visual attention point of the driver is the device which can be operated by using the voice inside the host vehicle for a preset time or longer. In a case where the determination result of the determination unit 16 indicates that the visual attention point of the driver is the device, the notification unit 17 instructs the device to allow the operation using the voice. In this manner, the driver can operate the device without taking the driver's hand off the steering wheel.

In this way, according to the alarm device 1, it is possible to easily confirm the driver's intention to operate the device which can be operated by using the voice.

3-5. Usage Mode Relating to Information Presentation to Driver

While the vehicle travels, the driver may want to know what the object (for example, a building) outside the host vehicle is, in some cases. However, the driver cannot check the object by taking the driver's hand off the steering wheel and operating a mobile terminal. Therefore, the alarm device 1 can be used for a system which can present information relating to the object which is questionable to the driver.

In this case, the host vehicle information acquisition unit 10 acquires position information indicating the traveling direction or the position of the host vehicle. In addition, the vehicle external information acquisition unit 11 acquires map information which shows a map of surroundings where the host vehicle travels.

The sight line information acquisition unit 13 acquires the sight line information relating to the driver, and the eyeball position information acquisition unit 14 acquires the eyeball position information relating to the driver. The visual attention point calculation unit 15 calculates the visual attention point of the driver, based on the sight line information and the eyeball position information.

Here, for example, if the driver emits the voice of "What is that?", the notification unit 17 notifies the driver of the information relating to the object (for example, a building) located in a visual attention destination of the driver. The notification can be displayed as follows. An indicator (for example, a frame) is superimposed and displayed on the object indicated on the front windshield, the monitor, the head-up display, or the meter display, and the information of the object can be notified by using the voice or the display. In a case where it is determined that the driver pays visual attention to a road sign or a signboard in addition to the building, the information relating to the associated object may be notified to the driver.

In this way, according to the alarm device 1, even if the driver visits a place for the first time, the driver can easily search for a building or a store, or a foreign visitor who is not familiar with Japanese road signs can recognize the road signs.

4. Other Embodiment

In the above-described embodiment, the following case has been described. The determination unit 16 sets the visual attention region 6 on the virtual plane 4 including the visual attention required target outside the host vehicle. In a case where the visual attention point is included in the visual attention region 6, it is determined that the driver pays visual attention to the visual attention required target. However, the determination unit 16 can be configured to make determination without setting the virtual plane 4 and the visual attention region 6.

The embodiments disclosed here can be used for the alarm device which issues the alarm in response to the visual attention status of the driver when the driver drives the host vehicle.

A feature of an alarm device according to an aspect of this disclosure resides in that the alarm device includes a host vehicle information acquisition unit that acquires host vehicle information indicating a state of a host vehicle, a vehicle external information acquisition unit that acquires vehicle external information indicating a vehicle external status of the host vehicle, a visual attention target calculation unit that calculates a visual attention required target to which visual attention of a driver of the host vehicle is required, based on the host vehicle information and the vehicle external information, a sight line information acquisition unit that acquires sight line information indicating a sight line direction of the driver, an eyeball position information acquisition unit that acquires eyeball position information indicating an eyeball position of the driver on a three-dimensional coordinate, a visual attention point calculation unit that calculates a visual attention point to which the driver pays visual attention, based on the sight line information and the eyeball position information, a determination unit that determines whether or not the driver pays visual attention to the visual attention required target, based on the visual attention required target and the visual attention point, and a notification unit that notifies the driver of a determination result in a case where it is determined that the driver does not pay visual attention to the visual attention required target.

According to this configuration, the visual attention point of the driver is calculated on the three-dimensional coordinate. Accordingly, for example, even in a case where a head position of the driver moves, it is possible to accurately determine whether or not the driver pays visual attention to the visual attention required target. Therefore, it is possible to properly notify the driver of a detection result in response to a visual attention status of the driver.

In the alarm device, it is preferable that the visual attention point calculation unit calculates the visual attention point outside the host vehicle.

According to this configuration, even in a case where the visual attention required target is present outside the vehicle, it is possible to accurately determine whether or not the driver pays visual attention to the visual attention required target. Therefore, it is possible to properly notify the driver of the detection result in response to the vehicle external status.

In the alarm device, it is preferable that the determination unit sets a visual attention region on a virtual plane including the visual attention required target outside the host vehicle, and determines that the driver pays visual attention to the visual attention required target in a case where the visual attention point is included in the visual attention region.

According to this configuration, it is possible to easily determine whether or not the driver pays visual attention to the visual attention required target outside the host vehicle. Therefore, it is possible to properly notify the user of the detection result in response to the visual attention status of the driver.

In the alarm device, it is preferable that, in a case where it is presumed that the host vehicle smoothly travels on a road based on the host vehicle information, the visual attention target calculation unit calculates a traffic signal or a road sign, as the visual attention required target to which visual attention of the driver is required.

In the alarm device, it is preferable that, in a case where the host vehicle starts to travel when the traffic signal is changed from a red light to a green light, the visual attention target calculation unit calculates at least one of a person passing around the host vehicle, a bicycle passing around the host vehicle, and the other vehicle passing around the host vehicle, as the visual attention required target.

In the alarm device, it is preferable that the notification unit notifies the driver that the driver does not pay visual attention to the visual attention required target.

In the alarm device, it is preferable that the notification unit notifies the driver so as to prompt the driver to pay visual attention to the visual attention required target.

In the alarm device, it is preferable that the notification unit notifies the driver of information indicating what the visual attention required target is.

In the alarm device, it is preferable that the notification unit issues an alarm if the vehicle starts to move forward in a case where the determination result indicates that the visual attention point of the driver is not located forward of the host vehicle.

In the alarm device, it is preferable that the notification unit stops forward movement of the host vehicle.

In the alarm device, it is preferable that the determination unit determines whether or not the visual attention point of the driver is on the visual attention required target located forward of the host vehicle, and in a case where the determination result indicates that the visual attention point of the driver is not on the visual attention required target located forward of the host vehicle, the notification unit notifies the driver of a guidance that causes the sight line direction of the driver needs to be changed from a current direction to a direction of the visual attention required target located forward of the host vehicle.

In the alarm device, it is preferable that the notification unit displays an arrow so as to guide the sight line of the driver.

In the alarm device, it is preferable that in a case where the driver wants to know what a target located in a visual attention destination of the driver is, the notification unit notifies the driver of information relating to the target located in the visual attention destination of the driver.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An alarm device comprising:
a host vehicle information acquisition unit that acquires host vehicle information indicating a state of a host vehicle;
a vehicle external information acquisition unit that acquires vehicle external information indicating a vehicle external status of the host vehicle;
a visual attention target calculation unit that calculates a visual attention required target to which visual attention of a driver of the host vehicle is required based on the host vehicle information and the vehicle external information;
a sight line information acquisition unit that acquires sight line information indicating a sight line direction of the driver;
an eyeball position information acquisition unit that acquires eyeball position information indicating an eyeball position of the driver on a three-dimensional coordinate;
a visual attention point calculation unit that calculates a visual attention point to which the driver pays visual attention, based on the sight line information and the eyeball position information;
a determination unit that determines whether or not the driver pays visual attention to the visual attention required target, based on the visual attention required target and the visual attention point; and
a notification unit that notifies the driver of a determination result in a case where it is determined that the driver does not pay visual attention to the visual attention required target.

2. The alarm device according to claim 1,
wherein the visual attention point calculation unit calculates the visual attention point outside the host vehicle.

3. The alarm device according to claim 1,
wherein the determination unit sets a visual attention region on a virtual plane including the visual attention required target outside the host vehicle, and determines that the driver pays visual attention to the visual attention required target in a case where the visual attention point is included in the visual attention region.

4. The alarm device according to claim 1,
wherein in a case where it is presumed that the host vehicle smoothly travels on a road based on the host vehicle information, the visual attention target calculation unit calculates a traffic signal or a road sign, as the visual attention required target to which visual attention of the driver is required.

5. The alarm device according to claim 1,
wherein in a case where the host vehicle starts to travel when the traffic signal is changed from a red light to a green light, the visual attention target calculation unit calculates at least one of a person passing around the host vehicle, a bicycle passing around the host vehicle, and the other vehicle passing around the host vehicle, as the visual attention required target.

6. The alarm device according to claim 1, wherein the notification unit notifies the driver that the driver does not pay visual attention to the visual attention required target.

7. The alarm device according to claim 1, wherein the notification unit notifies the driver so as to prompt the driver to pay visual attention to the visual attention required target.

8. The alarm device according to claim 1, wherein the notification unit notifies the driver of information indicating what the visual attention required target is.

9. The alarm device according to claim 1, wherein the notification unit issues an alarm if the vehicle starts to move forward in a case where the determination result indicates that the visual attention point of the driver is not located forward of the host vehicle.

10. The alarm device according to claim 9, wherein the notification unit stops forward movement of the host vehicle.

11. The alarm device according to claim 1, wherein the determination unit determines whether or not the visual attention point of the driver is on the visual attention required target located forward of the host vehicle, and in a case where the determination result indicates that the visual attention point of the driver is not on the visual attention required target located forward of the host vehicle, the notification unit notifies the driver of a guidance that causes the sight line direction of the driver to be changed from a current direction to a direction of the visual attention required target located forward of the host vehicle.

12. The alarm device according to claim 11, wherein the notification unit displays an arrow so as to guide the sight line of the driver.

13. The alarm device according to claim 1, wherein in a case where the driver wants to know what a target located in a visual attention destination of the driver is, the notification unit notifies the driver of information relating to the target located in the visual attention destination of the driver.

* * * * *